June 28, 1960 A. P. RAIHA 2,943,179
METHOD AND APPARATUS FOR WELDING CYLINDRICAL SHELLS
Filed May 17, 1957 4 Sheets-Sheet 1

INVENTOR.
ANDREW P. RAIHA
BY
Barnes, Kisselle, Laughlin & Raisch
ATTORNEYS

June 28, 1960 A. P. RAIHA 2,943,179
METHOD AND APPARATUS FOR WELDING CYLINDRICAL SHELLS
Filed May 17, 1957 4 Sheets-Sheet 2
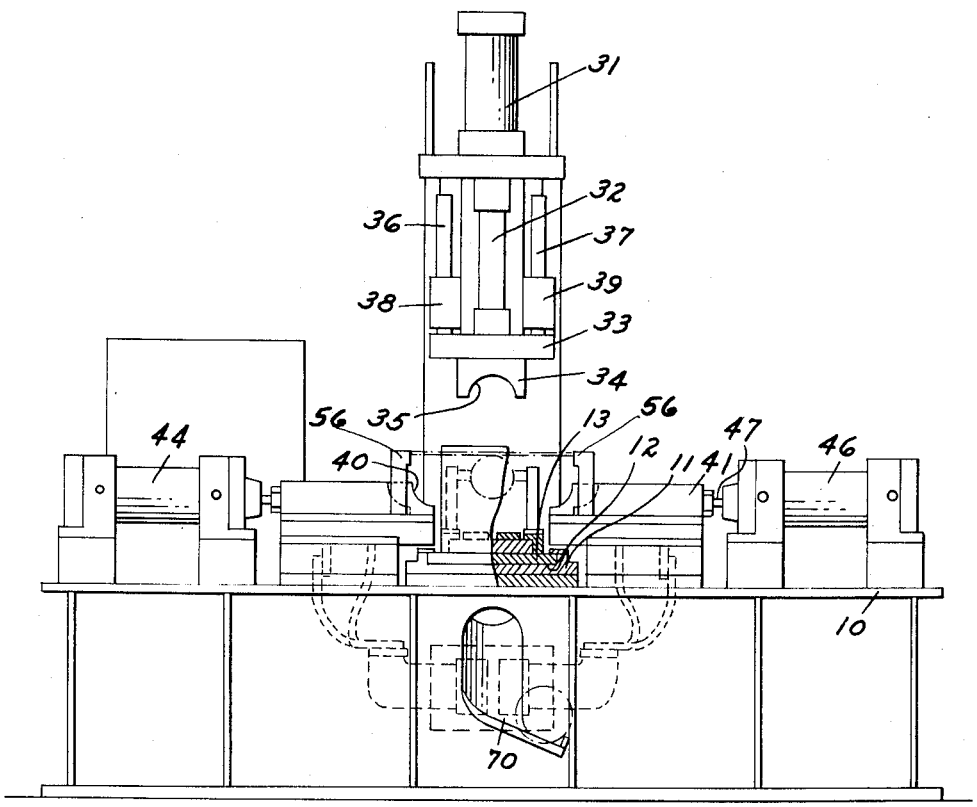
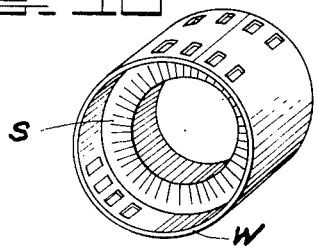
INVENTOR.
ANDREW P. RAIHA
BY
ATTORNEYS

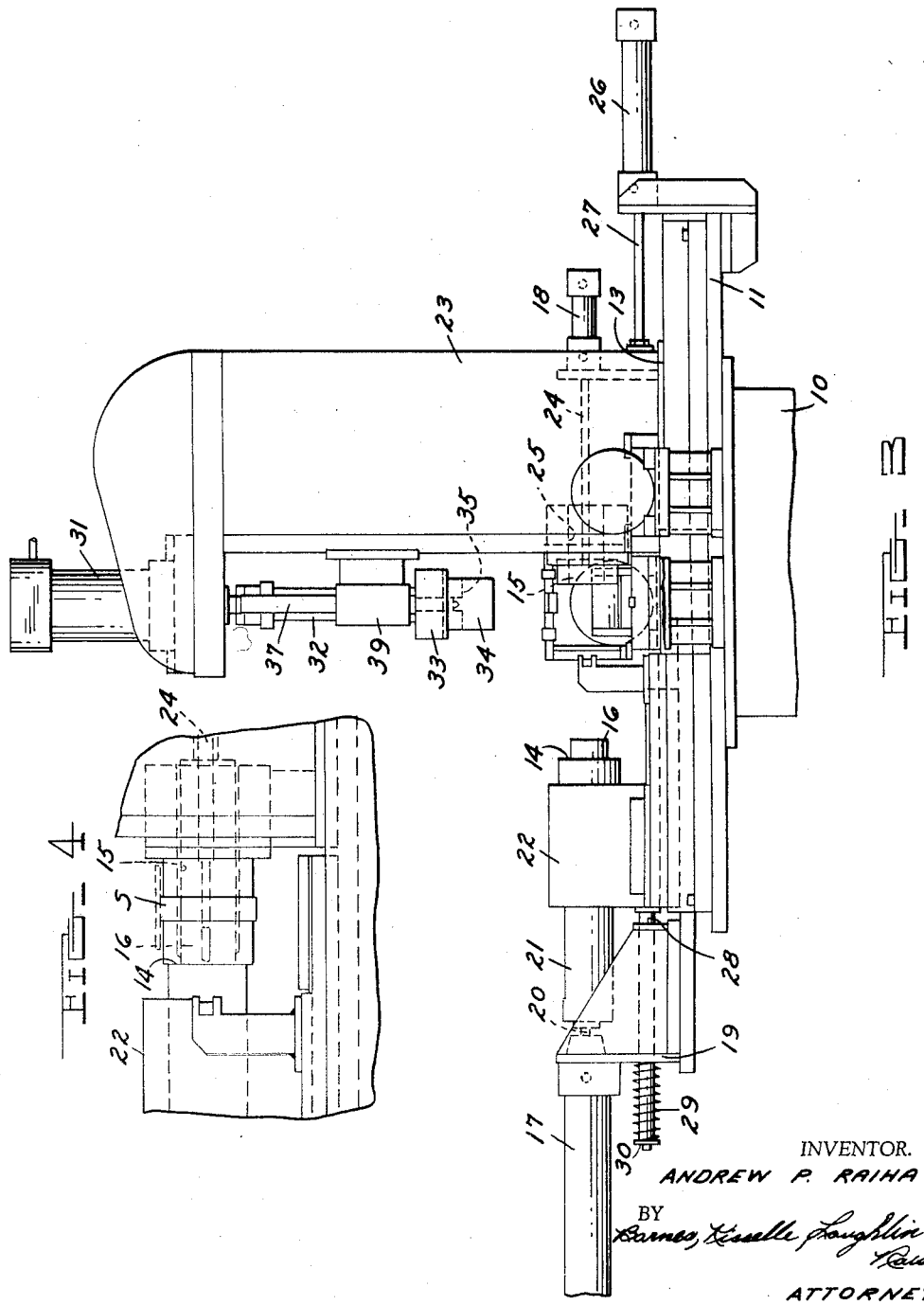

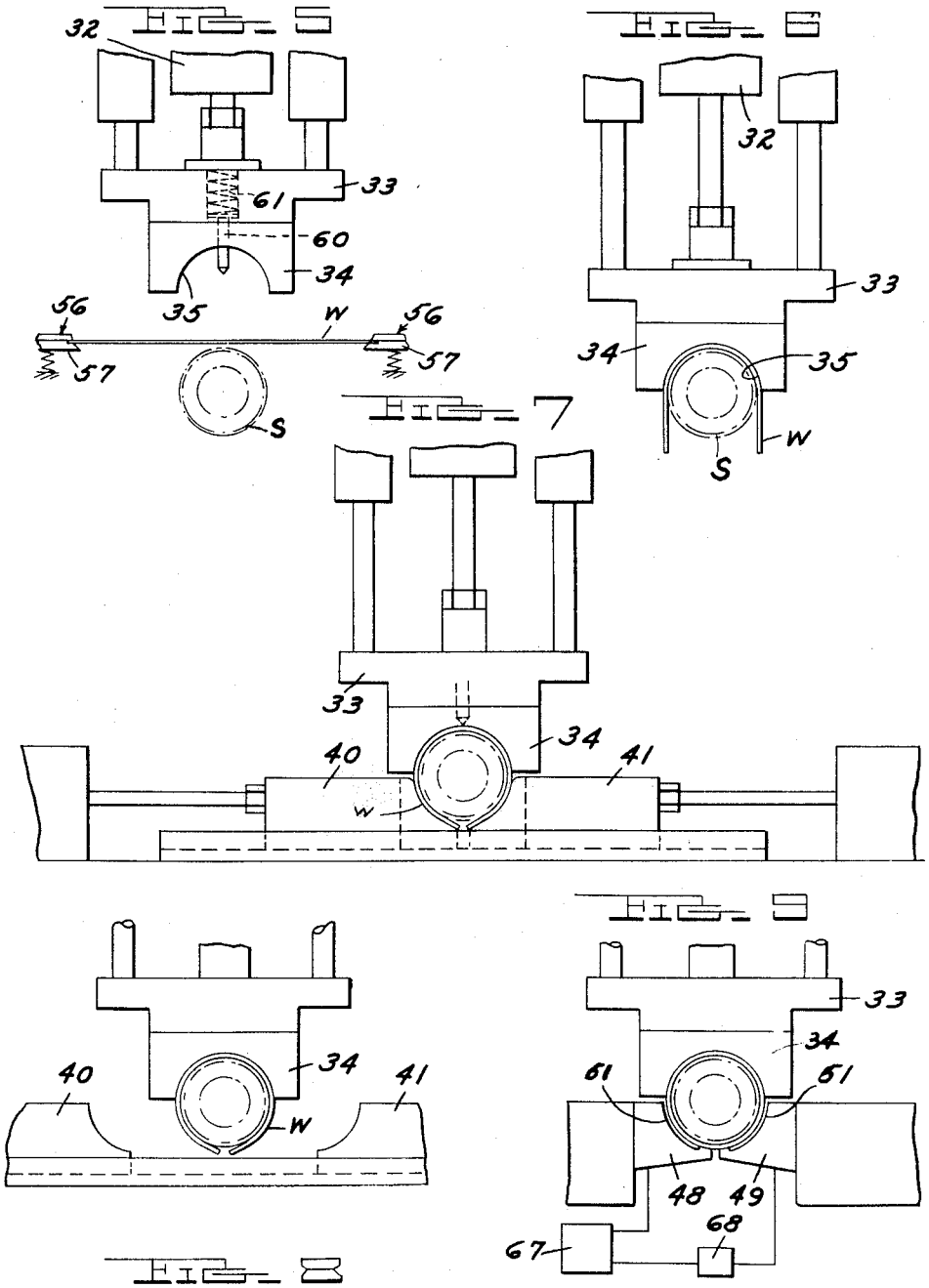

United States Patent Office 2,943,179
Patented June 28, 1960

2,943,179

METHOD AND APPARATUS FOR WELDING CYLINDRICAL SHELLS

Andrew P. Raiha, Chatham, Ontario, Canada, assignor to Progressive Welder of Canada Ltd., Chatham, Ontario, Canada, a corporation of Canada Filed May 17, 1957, Ser. No. 659,857

3 Claims. (Cl. 219—59)

This invention relates to a method and apparatus for welding cylindrical shells and particularly for making stator shell assemblies for electric motors wherein the stator assemblies comprise an annular stator surrounded and supported by a cylindrical shell.

At the present time it is customary to manufacture cylindrical shells from a flat rectangular sheet of metal by bringing the ends of the sheet into close proximity and forming a longitudinal seam between the ends by arc welding with a welding rod. Cylindrical shells made according to this method are subject to excessive warpage and as a result must be made from a thick sheet to minimize the warpage. In addition, the weld seam which is formed is thick and unsightly and must be ground or otherwise finished to improve the appearance. If the cylindrical shell is to be used in interfitting relationship with some other part the variations in size of such cylindrical shells results in a great number of rejects before a cylindrical shell is found which will fit properly. In an effort to minimize the rejects in cylindrical shells made by this procedure, the size of the flat sheet of metal which is used to make the cylindrical shell is controlled to close dimensions and within tolerances of approximately .005.

When cylindrical shells made according to this procedure are used to make stator assemblies for electric motors, an annular stator is inserted in the cylindrical shell and is fastened to the shell by spot welding at circumferentially spaced points. Because of the variations in size of such a cylindrical shell, it is necessary to fit each stator to a shell and it is often necessary to discard or reject a large number of cylindrical shells before one is found which will provide the proper fit with the stator.

It is therefore an object of this invention to provide an improved method and apparatus for making cylindrical shells wherein the shells are made by resistance butt welding.

It is a further object of this invention to provide such a method and apparatus wherein the cylindrical shell is made from a flat rectangular sheet of metal and the final bending dies act as the electrodes.

It is a further object of this invention to provide such a method and apparatus wherein the flat sheet of metal may be made of a thinner material than has been heretofore used.

It is a further object of this invention to provide such a method and apparatus for making cylindrical shells wherein the dimensions of the flat sheet of metal need not be controlled to the degree heretofore required.

It is a further object of this invention to provide such a method and apparatus for making stator assemblies wherein a cylindrical shell is simultaneously formed and wrapped around the stator.

It is a further object of this invention to provide a method of forming stator assemblies which is economical.

In the drawings:

Fig. 2 is an end elevational view of the apparatus, parts being broken away and parts being shown in section.

Fig. 3 is a side elevational view of the apparatus.

Fig. 4 is a side elevational view of the apparatus shown in Fig. 3 on an enlarged scale and parts being broken away.

Figs. 5 through 9 are partly diagrammatic views showing the relative positions of various parts of the apparatus in performing the method. Fig. 10 is a perspective view of a stator assembly made by the method and apparatus embodying the invention.

Figure 1:
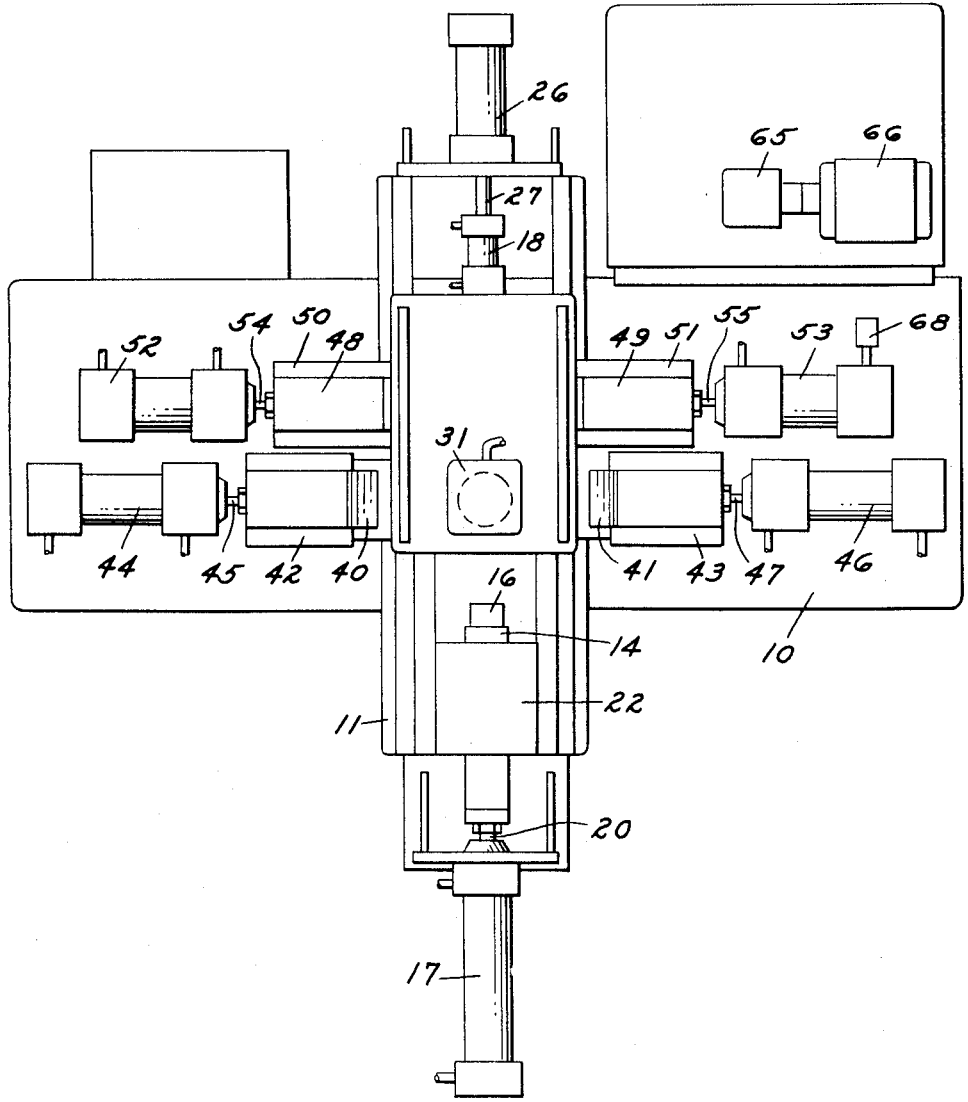
Fig. 1 is a fragmentary plan view of an apparatus embodying the invention.

The method and apparatus embodying the invention are utilized in making a cylindrical shell and particularly the stator assembly shown in Fig. 10, which comprises a cylindrical shell W surrounding and supporting an annular stator S. Shell W is made from a flat rectangular sheet of metal which has its ends welded to each other. The width of the workpiece is greater than the width of the stator S and the length thereof before welding is slightly greater than the peripheral circumferences of annular stator S, such that sufficient metal is provided at the ends to produce a butt weld.

Referring to Figs. 1, 2 and 3, the apparatus comprises a base 10 including a flat bed 11 extending transversely of base 10. Bed 11 is formed with a groove 12 which provides a trackway in which a horizontal slide member 13 is movable back and forth. Means are provided on the slide member 13 for clamping an annular stator in position such that its axis is horizontal and its periphery is exposed or free. Such means includes a pair of diametrically opposed clamping dies 14, 15 which are adapted to engage the ends of a stator S (Fig. 4). Clamping die 14 has a portion 16 thereof of smaller diameter which enters the opening in stator S while die 15 is shaped to engage the stator S.

Clamping dies 14 and 15 are moved horizontally toward and away from each other in order to clamp and unclamp a stator by piston motors 17 and 18, respectively. As shown in Figs. 1 and 3, piston motor 17 is mounted on slide 13 by means of a bracket 19. Piston rod 20 of piston motor 17 extends horizontally and die 14 is mounted on the free end thereof. Piston rod 20 is also provided with a cylindrical block 21 adjacent clamping die 14. Block 21 is clamped on a support 22 slidably mounted on slide 13, for guiding the free end of the piston rod 20. Piston motor 18 is supported on an upright member 23 mounted on slide 13. Clamping die 15 is mounted on the free end of piston rod 24 of piston motor 18. The movement of clamping die 15 is guided by a cylindrical bearing 25 in upright 23. In order to facilitate the return of support 22 to its outermost position a shaft 28 is fixed on support 22 and extends through an opening in bracket 19. A coil spring 29 is compressed between bracket 19 and a washer 30 on the end of shaft 28 thereby yieldingly urging shaft 28 and support 22 outwardly.

As shown in Fig. 3, slide 13, including the clamping means and the member 23, is shifted back and forth on bed 11 by an indexing piston motor 26. Piston rod 27 of piston motor 26 is connected to member 23.

As shown in Figs. 2 and 3, member 23 has mounted thereon a vertically extending piston motor 31 which has the piston rod 32 thereof extending downwardly. A cross head 33 is mounted on the lower end of piston rod 32 and supports a first bending die 34. First bending die 34 is formed with a semi-circular concave surface 35 which faces downwardly and is movable toward and away from stator S to bend the central portion of a workpiece as presently described. First bending die 34 is guided in its movement by vertical guide rods 36, 37 on cross head 33 which are slidable in guide blocks 38, 39, respectively, on member 23.

As shown in Figs. 3 and 5, a portion of piston rod 32 of piston motor 31 is hollow and forms the cylinder of a smaller piston motor. The piston rod 60 of the smaller piston motor projects downwardly through cross head 33 and die 34 and is movable into engagement with a shell workpiece as presently described. Piston rod 60 is yieldingly urged upwardly by a spring 61 coiled around rod 60 and compressed between a shoulder on rod 60 and a shoulder in bending die 34.

Referring to Fig. 1, slide 13 is shiftable back and forth on bed 11 from a first station to a second station by the indexing cylinder 26. At the first station diametrically opposed intermediate dies 40, 41 are provided for movement toward and away from each other and the stator S to bend the stator as presently described. Each intermediate bending die 40, 41 is provided with a curved concave surface having a circular arc with an angular extent of about 70°. Intermediate bending dies 40, 41 are guided in their movement by tracks 42, 43, respectively. A piston motor 44 has piston rod 45 thereof connected to die 40, thereby providing a means for moving the die 40 toward and away from the stator. Another piston motor 46 has the piston rod 47 thereof connected to die 41 in a similar manner to provide means for moving the die 41.

At the second station final bending dies 48, 49 are provided for movement toward and away from each other and the stator S for finally bending the stator as presently described. Each final bending die 48, 49 has a circular concave surface with an angular extent of about 90°. Final bending dies 48, 49 are guided in their movement by means of tracks 50, 51, respectively, and are moved by piston motors 52, 53, respectively, which are connected to the dies through their respective piston shafts 54, 55.

A support is provided at the first station for holding a flat rectangular shell workpiece W in horizontal position above the periphery of a stator S clamped by dies 14, 15. The support includes a pair of jaws 56 on each side of slide member 13. The lower jaw 57 of each pair of jaws is spring loaded in order that it is movable out of the way to permit bending of the ends of the workpiece W downwardly into contact with the periphery of the stator S.

As shown in Fig. 9, each of the final bending dies 48, 49 is provided with an insert 61 made of non-conductive material. Each insert 61 has an angular extent of approximately 70° and lies along the concave surface of each die. By this construction, the major portion of the concave surface of each die is non-conductive while the minor portion which contacts the ends of the workpiece W is conductive.

The various piston motors are provided with operating fluid such as hydraulic fluid from a hydraulic pump 65 driven by an electric motor 66. The controls for operating the several piston motors may be manual or automatic and the details thereof are not within the scope of this invention.

As shown in Fig. 9, a source of welding current 67 provides welding current to final bending dies 48, 49 so that dies 48, 49 become the welding electrodes. One of the piston motors 52, 53 includes a pressure-responsive switch 68 (Figs. 1 and 9) which is operable to energize the welding current source 67 when the fluid pressure in piston motor 53 exceeds a predetermined amount. Such an increase in fluid pressure occurs when the ends of the workpiece contact each other and offer an increased resistance to the movement of dies 48, 49 toward each other.

The operation of the apparatus may be summarized as follows: A stator S is first placed on projection 16 of die 14 and piston motors 17, 18 are actuated to bring clamping dies 14, 15 toward each other into clamping engagement with stator S. A workpiece W of flat sheet material is then placed between jaws 56 in overlying relationship to clamped stator S (Figs. 4 and 5). The small piston motor, the cylinder of which is formed by hollow piston rod 32, is then actuated to move plunger 60 downwardly into contact with the workpiece W and initially hold the workpiece W in position against the periphery of stator S. Piston motor 31 is then actuated to move first bending die 34 downwardly into contact with workpiece W, thereby bending the central portion of workpiece W into contact with the peripheral surface of stator S. As shown in Fig. 6, since the surface 35 of die 34 is semicircular, the central portion of workpiece W which is bent into contact with stator S by first bending die 34 has an angular extent of approximately 180°. As first bending die 34 is moved downwardly plunger 60 is retracted upwardly by actuation of the smaller piston motor.

With the first bending die 34 in its downward position, piston motors 44, 46 are actuated to move intermediate bending dies 40, 41 inwardly toward stator S causing the dies 40, 41 to engage the workpiece W and bend intermediate portions of workpiece W into contact with the peripheral surface of the stator S. As shown in Figs. 7 and 8, since the circular extent of the concave surface of dies 40, 41 is less than 90°, only the intermediate portions of the workpiece between the central portion and the ends thereof are bent into contact with the stator S. The ends are out of contact with each other and with stator S. Piston motors 44, 46 are again actuated to withdraw intermediate bending dies 40, 41, and indexing piston motor 26 is then actuated to shift slide 13 and, in turn, stator S to the second station adjacent final bending dies 48, 49. Piston motors 52, 53 are thereafter actuated to move final bending dies 48, 49 inwardly to cause the ends of the workpiece W to contact each other and to bend the ends of the workpiece into contact with the peripheral surface of the stator S.

As the ends of the workpiece W contact and abut each other, an increased force is encountered opposing the movement of the final bending dies 48, 49 toward each other. This resistance is evidenced by an increase in fluid pressure in the fluid circuit of the piston motor 53 causing pressure switch 68 to energize the welding current source 67 to provide welding current to final bending dies 48, 49 and through the dies 48, 49 to the ends only of the workpiece W. The application of welding current is continued until the ends are brought into contact with the peripheral surface of the stator S. The application of welding current to the final bending dies 48, 49 combined with the movement of the bending dies 48, 49 toward each other produces a resistance welding of the ends of the workpiece and forms a butt weld between the ends of the workpiece. The use of the non-conductive inserts 50, 51 on the faces of the bending dies 48, 49 insures that the welding current will pass from the bending dies 48, 49 only to the end portions of the workpiece, thereby diminishing the possibility of short circuiting through the stator S while the end portions are being bent into contact with the stator S by the final bending dies.

Final bending dies 48, 49 are then withdrawn by actuation of the piston motors 52, 53 and slide 13 is shifted by indexing piston motor 26 to the first station where piston motors 17, 18 are actuated to retract dies 14, 15, permitting the stator S to drop downwardly under the action of gravity and be guided out of the apparatus by chute 70 (Fig. 2).

As shown in Fig. 10, the resultant stator assembly comprises a cylinder surrounding the annular stator in intimate contact with the peripheral surface of the stator.

Although the method and apparatus are particularly applicable to the making of stator shell assemblies for electric motors, it should be understood that cylindrical shells can also be made by this method. In order to make cylindrical shells a collapsible mandrel is used in place of stator S to serve as a support around which the workpiece W is bent and welded. After the cylindrical shell is made, the mandrel is collapsed to permit the removal of the cylindrical shell from the machine.

The cylindrical shell made by this method does not warp during the manufacture and as a result a thinner workpiece can be used in making it. The resistance butt weld which is formed between the ends of the workpiece is relatively thin and no further finishing or grinding is required. The size of the cylindrical shell is always consistent and an accurate control of the length of the workpiece which is used to make the cylindrical shell is not required in order to obtain a cylindrical shell of the proper size. The only requirement is that the length of the workpiece be slightly greater than the periphery of the stator S in order that sufficient material is provided to form the resistance butt weld. Except for this requirement the length of the workpiece can vary within relatively wide limits and need not be controlled within thousandths of an inch as has been heretofore necessary.

When stator assemblies are made according to the invention, there is no necessity for fitting a stator to a shell, the assembly being formed in one operation thus resulting in a substantial saving in time and money. The problem of rejects resulting from trial and error fitting of stators in previously formed cylindrical shells is entirely eliminated.

Although I do not wish to be bound by the theory involved, in my opinion, a factor in obtaining the beneficial results is the use of the final bending dies in the dual capacity of bending dies and electrodes. Another factor is the application of current to the extreme end portions only of the workpiece W which I believe prevents the welding current from shunting through the stator S during the initial application of current while the ends are being forced together to form the weld and are being forced into contact with the surface of the stator.

I claim:

1. In an apparatus for making a cylindrical shell, the combination comprising a support movable back and forth between a first and second station, means for moving said support back and forth between said first and second stations, means on said support forming an annular mandrel having its axis parallel to the line of movement of said support, means on said support for applying a force to a flat rectangular workpiece placed on the periphery of said mandrel to bend the central portion of said workpiece into contact with the periphery of said mandrel, means at said first station for applying a force to the intermediate portions of said workpiece between the central portion and the ends thereof to bend said intermediate portions into contact with the periphery of said mandrel, means at said second station for applying a force to the ends of said workpiece to bring said ends into contact with each other and bend said ends into contact with the periphery of said mandrel, means for applying a welding current to the ends of said workpiece, and means responsive to the increase in force caused by contact of the ends of the workpiece with each other for energizing said welding current means.

2. In an apparatus for making a stator assembly comprising an annular stator surrounded by a cylindrical shell, the combination comprising a support movable back and forth between a first and second station, means for moving said support back and forth between said first and second stations, means on said support for clamping an annular stator with the axis of the stator parallel to the line of movement of said support, means on said support for applying a force to a flat rectangular workpiece placed on the periphery of said stator to bend the central portion of said workpiece into contact with the periphery of said stator, means at said first station for applying a force to the intermediate portions of said workpiece between the central portion and the ends thereof to bend said intermediate portions into contact with the periphery of said stator, means at said second station for applying a force to the ends of said workpiece to bring said ends into contact with each other and bend said ends into contact with the periphery of said stator, and means for applying a welding current to the ends of said workpiece.

3. The combination set forth in claim 2 including means for applying an initial holding force to said workpiece to hold said workpiece against said stator until said means for bending said central portion of the workpiece contacts said workpiece.

References Cited in the file of this patent

UNITED STATES PATENTS

| | | |
|---|---|---|
| 1,135,539 | Mack | Apr. 13, 1915 |
| 1,288,866 | Friel | Dec. 24, 1918 |
| 1,339,969 | Murray et al. | May 11, 1920 |
| 1,993,960 | Fenzel et al. | Mar. 12, 1935 |
| 2,066,025 | Zublin et al. | Dec. 29, 1936 |
| 2,259,914 | Weisenburg | Oct. 21, 1941 |
| 2,272,633 | Borgadt | Feb. 10, 1942 |
| 2,484,868 | Winters | Oct. 18, 1949 |
| 2,578,832 | Pearson et al. | Dec. 18, 1951 |
| 2,790,067 | Piley et al. | Apr. 23, 1957 |